(12) United States Patent
Su

(10) Patent No.: US 7,900,527 B1
(45) Date of Patent: Mar. 8, 2011

(54) ELECTRICALLY DEFLECTED NANOMECHANICAL SENSORS

(75) Inventor: Ming Su, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 375 days.

(21) Appl. No.: 11/959,706

(22) Filed: Dec. 19, 2007

Related U.S. Application Data

(60) Provisional application No. 60/876,878, filed on Dec. 22, 2006.

(51) Int. Cl.
*G01D 7/02* (2006.01)
(52) U.S. Cl. .................................................. 73/866.1
(58) Field of Classification Search ............... 73/866.1
See application file for complete search history.

(56) References Cited

U.S. PATENT DOCUMENTS

| | | | |
|---|---|---|---|
| 3,941,927 A * | 3/1976 | Russell | 359/196.1 |
| 6,722,200 B2 | 4/2004 | Roukes et al. | |
| 6,835,926 B2 * | 12/2004 | Weitekamp et al. | 250/234 |
| 6,988,826 B2 | 1/2006 | Zribi et al. | |
| 7,086,288 B2 | 8/2006 | Lee et al. | |
| 2004/0071427 A1 * | 4/2004 | Ling et al. | 385/131 |

OTHER PUBLICATIONS

CH. Foerster, V. Comalla, V. Lebedev, O. Ambacher, K. Bruechner, R. Stephan, MA.A. Hein, "SiC/Si and AlN/Si Heterostructures for Microelectromechanical RF Sensors" Dept. of Nanotechnology, Center for Micro-and Nanotechnologies, Dept. for RF and Microwave Tech., Technishe University Ilmenau, Germany, Paper, 4 Pages.
Richie Khandelwal, Sahil Sahni, "Nanotribology, The Road to no WEAR!" Paper, 5 pages.

* cited by examiner

*Primary Examiner* — Hezron Williams
*Assistant Examiner* — Alex Devito
(74) *Attorney, Agent, or Firm* — Brian S. Steinberger; Phyllis K. Wood; Law Offices of Brian S. Steinberger, P.A.

(57) ABSTRACT

An electrically-induced deflective amplification sensor as an actively controlled and reconfigurable nanomechanical sensor for the detection and recognition of chemicals, biomolecules, and gaseous molecules. The electrically-induced deflective amplification sensors use electric fields to control the bending of transducers, have adjustable sensitivities that depend on electric field strength, and reconfigurable operation ranges for the detection of target molecules at ultra-low and ultra-high concentrations. The sensors are highly integrated, sensitive, provide real-time detection ability, and do not require labels. The electrically-induced deflective amplification transducers can be reconfigured to identify molecules in spectroscopy. A new type of electrophoresis is established using nanostructured transducers. The E-IDEA is applicable to optical fiber, nanomechanical cantilever, waveguide and nanowire or nanotube tranducers. These adaptive and reconfigurable sensors have application in the fields of national security, public health and economic development.

14 Claims, 15 Drawing Sheets

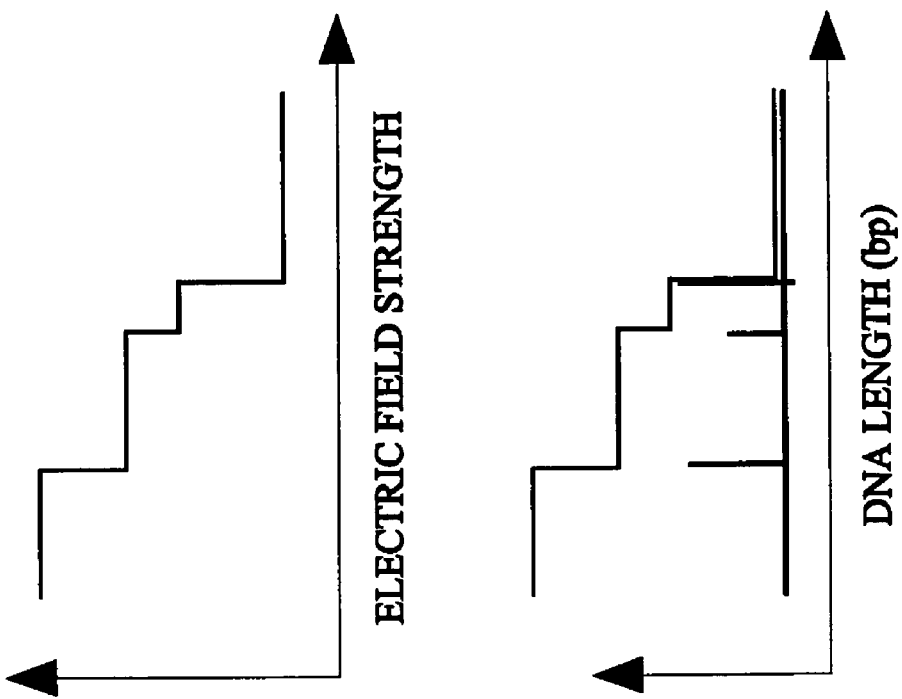
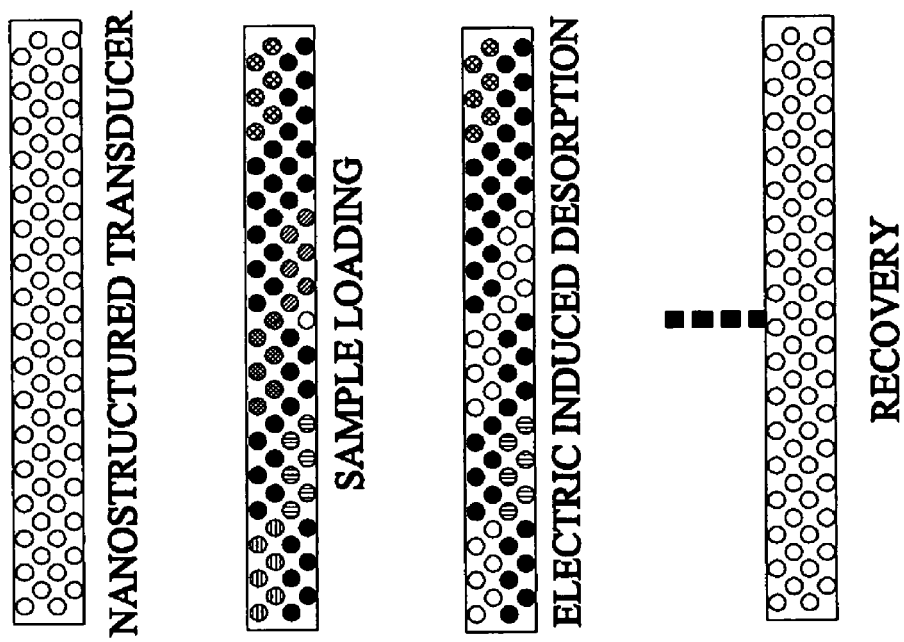

ELECTRICALLY DEFLECTED NANOMECHANICAL SENSORS

This application claims the benefit of priority to U.S. Provisional Application No. 60/876,878 filed on Dec. 22, 2006.

FIELD OF THE INVENTION

This invention relates to smart sensors in the field of nanotechnology, and in particular to, methods, devices and systems for electrically deflected nano-mechanical sensors to measure and characterize physical properties of materials from ambient temperatures and conditions to temperatures up to 400° C.

BACKGROUND AND PRIOR ART

In the $21^{st}$ century, people are developing smart materials and smart sensors. The smart sensors, made of smart materials, provide in association with other components like actuators and control systems, the functional capability to react to internal and external environments and achieve adaptability. Examples include, but are not limited to, life science research involving the study of interaction between biological and other molecules, in-vitro diagnostics, food safety whereby bacteria and toxins are detected without the need for time-consuming growth experiments, fresh water control involving the detection of heavy metal ions in fresh water or terror-related compounds, such as, ricin in fresh water supplies and gas detection, detection of explosives, chemical warfare agents, narcotics and the like.

The realization that many molecular phenomena result in mechanical responses at the nanoscale level promises to bring about a revolution in the field of chemical, physical, and biological sensor development. Exploiting nanoscale mechanics for molecular recognition is a paradigm shift in sensor technology. In a quest for smaller, faster, better, smarter sensors, the micro-electromechanical systems (MEMS) have been scaled to the submicron range, leading to the new category of nanoelectromechanical systems (NEMS). The nanomechanical sensor opens additional potential for low-power high-frequency devices for mobile communications, or bio-sensors for the detection of single molecules by sensitized NEMS surfaces.

For example, the resonance frequency of a cantilever beam varies sensitively as a function of molecular adsorption. In addition, when the adsorption is confined to one side of the cantilever, the cantilever undergoes deflection due to adsorption-induced variation in surface free energy. Chemical selectivity can be achieved by coating the cantilevers with selective molecules. It is postulated that the cantilever bending depends on the changes in surface free energy while the resonance frequency variation is entirely due to mass loading (both specific and nonspecific adsorption). The minimum detectable adsorbed mass on a cantilever sensor can be increased by orders of magnitude by changing the dimensions of the device; smaller and thicker cantilevers offer higher resonance frequency and therefore better mass detection sensitivity.

Thus, a fast developing area of smart sensors is evolving, and an advanced combination of materials, sensors, actuators, control and processing are blended suitably to achieve devices with a huge potential for applications in many different fields.

Highly sensitive and selective detection of chemicals and biomolecules using integrated micro- and nanodevices have attracted much attention due to the importance in national security, clinical diagnostics, and industrial processes. Among these devices, nanomechanical cantilever sensors can detect surface stress or resonant frequency of a thin solid device induced by subtle molecular interactions. These cantilever nanomechanical sensors are robust and reliable in the detection and can be mass-produced using microfabrication techniques. Furthermore, their label-free and real-time detection abilities can be combined with microfluidics and microelectronics to create portable lab-on-chip systems. After the specific receptors are immobilized on one side of the cantilever, the interaction with certain molecules changes the surface stresses and leads to the bending of the cantilever.

Alternatively, the cantilever sensor can detect some physical changes such as temperature, relative humidity, viscosity, magnetic field, radiation and light intensity. These sensors can work in a dynamic mode in which the resonant frequency is monitored to reflect the change in the effective mass induced by molecule adsorption. Due to their small size and mass, nanomechanical cantilever sensors are sensitive to the mass changes induced by molecular scale recognition or adsorption, and have been used to detect nucleic acids, gaseous molecules, proteins, explosives, and other substances. The bending and the vibration of the cantilever can be measured using different approaches, including piezoresistive and piezoelectric method, optical interferometry and laser reflection methods. The laser reflection method is frequently utilized wherein a laser beam is used to illuminate the free end of a one-end fixed cantilever and changes in position are detected by a position sensitive detector.

In spite of the many advantages of the nanomechanical cantilever sensor, there are limitations and disadvantages of nanomechanical cantilever sensors regarding their adaptability and reconfigurablility. The first limitation is that for a certain magnitude of bending, it is necessary to determine whether it is due to the interaction with target species or not. This occurs because the specificity and selectivity of nanomechanical sensors comes only from immobilized molecules or receptors. The mechanical deformations of the cantilevers do not directly relate to molecular structure or property, even if the peak shape (ascending side and descending side) contains some specific molecular information. Although spectroscopic techniques (infrared and visible spectrometry, mass spectrometry, and nuclear magnetic resonance) could provide detailed information for molecular identification, adding scanning wavelength spectroscopic accessories to portable sensors increases their size, complexity, and expense, while reducing adaptability of the devices. Because one of the most important driving forces of creating a small sensor is to achieve wide and easy deployment as the result of compact size, simple structure and low price, combining the device with one spectroscopic method is thus not preferred.

Secondly, for most of the biomolecular detection applications, cantilever sensors have to take an extra step (e.g., heat treatment or stringent washing) to remove attached molecular species for the next detection. In other words, the sensor needs to recognize and detect molecules with adjustable sensitivity over a large concentration range call for an adaptive and reconfigurable sensing strategy.

Another limitation of nanomechanical cantilever sensors is the structural configuration wherein the sensor must have rectangular cross sections with thickness at sub-micrometer scale, and require that the top surface and the bottom surface be made of different material or be chemically modified. Usually a gold thin film is deposited on one side of the silicon substrate to reflect a laser beam and immobilize receptors. Such asymmetric bimorph thin film structures are sensitive to temperature change. The temperature must be controlled precisely using a thermoelectrically stabilized cell and stabilized for hours before detection, otherwise the specific binding signal cannot be differentiated from thermal noise.

Another limitation of the nanomechanical cantilever sensor is that during laser deflection detection, accurate bending measurements depend on the position of laser beam shining on the cantilever. However, 5-20% misplacement is normal because the size of the laser spot is larger than the actual width of the cantilever. A slight positional change of the laser spot on the cantilever changes the detection sensitivity. Therefore, an arbitrary bending of the sensor cannot be determined if the laser illumination position is changed due to a system perturbation. Such uncertainty makes it difficult to cross-compare the bending results.

It is important to note most surface modification based sensing devices, such as the nanomechanical cantilever sensors, do not possess the desired adaptability, reconfigurability and identification ability. These sensors have narrow detection or operation ranges, cannot detect target species at ultra low concentrations, and will be saturated at ultra high concentrations. Most importantly, all the surface modified sensors have to depend on either highly selective molecules or a large number of sensors in an array to determine the nature of molecules, making these sensors unsuitable for highly specific detection of species in uncontrolled field environments.

To place each sensing element in specific locations various techniques have been explored, but the deposition of sensing elements on contact electrodes with good registry is a low yield process and usually requires sophisticated instruments for simultaneous observation and electrode formation. It turns out that the manipulation of different sensing units is hard and time-consuming. The fabrication costs are prohibitively high for daily manufacture. When compared with instruments that are used in traditional chemical and biological analysis, micro- or nanoscale sensing devices are sensitive, integratable, relatively inexpensive, easy to be deployed and fast in response. However, unless a significant advancement in mechanism is realized, such devices are continuously challenged by the miniaturization of traditional instruments such as micro-mass spectrometers, optical sensors, and on-chip microanalysis systems.

The nanomechanical sensors of the present invention solve many problems and overcome many limitations in the prior art.

SUMMARY OF THE INVENTION

The first objective of the present invention is to provide an electrically induced deflective amplification (E-IDEA) sensor for the adaptive and reconfigurable detection of chemical and biological molecules using optical fiber transducers.

The second objective of the present invention is to provide an electrically induced deflective amplification sensor for the adaptive and reconfigurable detection of chemical and biological molecules using waveguide transducers.

The third objective of the present invention is to provide an electrically induced deflective amplification sensor for the adaptive and reconfigurable detection of chemical and biological molecules using microfabricated cantilever transducers.

The fourth objective of the present invention is to provide an electrically induced deflective amplification sensor for the adaptive and reconfigurable detection of chemical and biological molecules using nanowire transducers.

The fifth objective of this invention is to provide an electrically induced deflective amplification sensor for the adaptive and reconfigurable detection of chemical and biological molecules using nanotube transducers.

The sixth objective of this invention is to provide an electrically induced deflective amplification sensor for the adaptive and reconfigurable detection of chemical and biological molecules using piezoelectric or piezoresistive methods.

The seventh objective of this invention is to provide an electrically induced deflective amplification sensor for the adaptive and reconfigurable detection of chemical and biological molecules using optical interfermetry.

The eighth objective of this invention is to provide an electrically induced deflective amplification sensor for the adaptive and reconfigurable detection of chemical and biological molecules for accurate, on-line and in-situ monitoring.

The ninth objective of the invention is to provide an electrically induced deflective amplification sensor for the adaptive and reconfigurable detection of chemical and biological molecules at a temperature range between ambient temperatures to approximately 400° C.

The tenth objective of the invention is to provide an electrically induced deflective amplification (E-IDEA) sensor for the adaptive and reconfigurable detection of chemical and biological molecules that is not sensitive to temperature change.

A first embodiment of the present invention provides an electrically deflected nanomechanical sensor including a first and a second parallel electrode plates separated by a gap for applying a voltage difference to the first and second parallel electrode plates to generate an electric field between the first and second parallel electrode plates, an adaptive and reconfigurable transducer positioned within the gap between the first and second parallel electrode plates, the adaptive and reconfigurable transducer bending in response to detecting a physical property of a material within range and a detecting device for detecting a position of the adaptive and reconfigurable transducer, the detected material identified by a change in position of the adaptive and reconfigurable transducer. In an embodiment, the adaptive and reconfigurable transducer includes a micro- or nano-scale optical fiber and a coupling device for guiding and confining a light beam for transmitting through the optical fiber, the change in position of the optical fiber output detected by the detector to detect the bending of the optical fiber in response to the detected material. The detecting device includes a position sensitive detector for detecting a position of the transmitted light for determining the bending of the optical fiber, a piezoelectric or piezosensitive device for detecting a position of the transmitted light beam for determining the bending of the optical fiber. In another embodiment, the transducer is at least one of an optical fiber, a waveguide, a microfabricated cantilever, a nanowire, a nanotube, and a glass nanofiber and the detecting device is used to detect at least one of a gaseous molecule, a chemical molecule and a biological molecule.

A second embodiment provides a method for fabricating an electrically deflected nanomechanical sensor by forming a first conductive layer as a first electrode, depositing a first photoresist layer on the first conductive layer, placing a transducer on the photoresist layer, depositing a second photoresist layer on the first photoresist layer on the first photoresist layer over the transducer, forming a second conductive layer on the second photoresist layer and exposing the formed layers to an ultra violet light to remove the exposed first and second photoresist layers leaving a partially exposed transducer between the first and second conductive layers. Placing a transducer on the photoresist layer is accomplished by fabricating an optical fiber for transmitting a laser beam. The method further includes designing the optical fiber to achieve a predetermined mechanical and optical property. The step of placing a transducer on the photoresist layer includes placing a cantilever on the first photoresist layer and forming a cantilever having a porous structure or forming plural nanostructured glass arrays having an ordered arrangement on an external surface of the cantilever.

A third embodiment provides a system for detecting a physical property of a material including a first and a second parallel electrode plate separated by a gap, a power source connected between the first and second parallel electrode plates for generating an electric potential difference in the gap between the first and second parallel electrode plates, an adaptive and reconfigurable transducer positioned within the gap between the first and second parallel electrode plates and a detection device for detecting a bending of the adaptive and reconfigurable transducer in response to the detected a physical property of a material within range of the sensor. In an embodiment, the adaptive and reconfigurable transducer includes a micro- or nano-scale optical fiber, a laser source for providing a laser beam, a waveguide coupled with the optical fiber for guiding and confining the laser beam for transmitting through the optical fiber and an amplifier for amplifying the transmitted fiber beam, the detection device detecting a position of the amplified laser beam for determining a physical characteristic of the material. The power source includes a variable voltage source for generating a variable voltage for applying to the first and a second parallel electrode.

Further objects and advantages of this invention will be apparent from the following detailed description of a presently preferred embodiment that is illustrated schematically in the accompanying drawings.

BRIEF DESCRIPTION OF THE FIGURES

FIG. 8a illustrates E-IDEA based electrophoretic analysis of DNA mixture on a nanostructured transducer.

FIG. 8b shows two graphs showing the bending of the transducer at different electric field strengths and the corresponding graph converting to DNA amount verses length.

DESCRIPTION OF THE PREFERRED EMBODIMENT

Figure 1A:
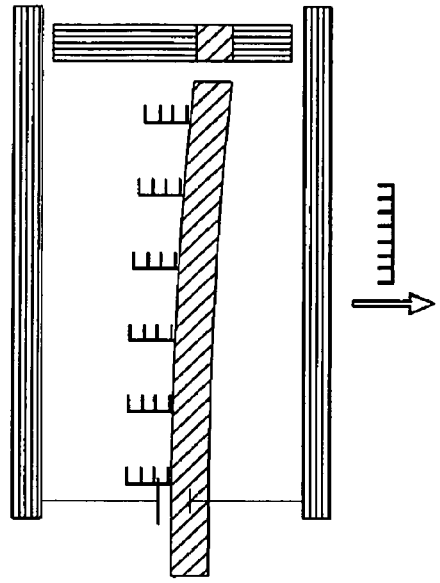
FIG. 1a shows an electrically-induced deflective amplification transducer in cantilever form before molecular detection.
Figure 1B:
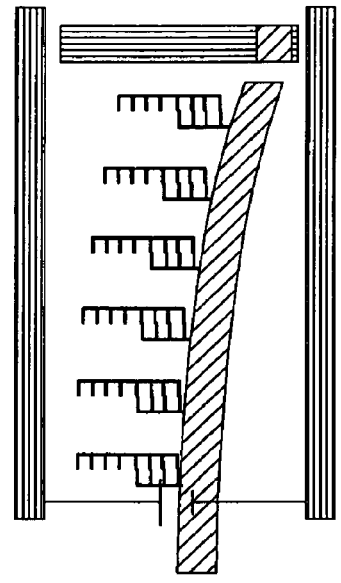
FIG. 1b shows an electrically-induced deflective amplification transducer in cantilever form after molecular detection, as shown by bending.
Figure 1C:
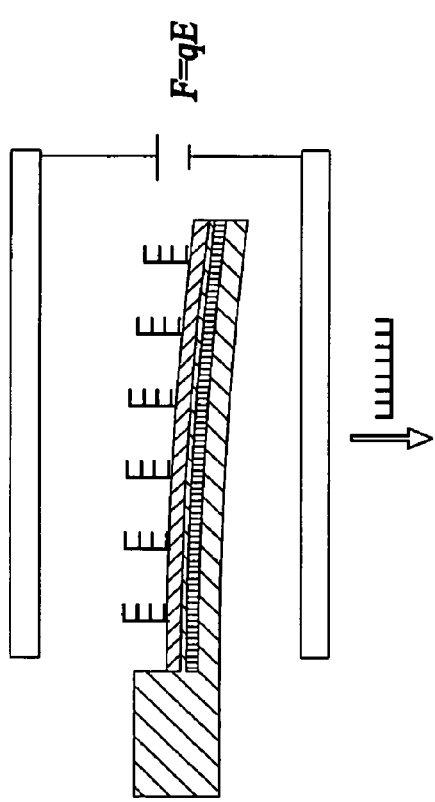
FIG. 1c is a schematic drawing of an electrically-induced deflective amplification transducer in optic fiber form before molecular detection.
Figure 1D:
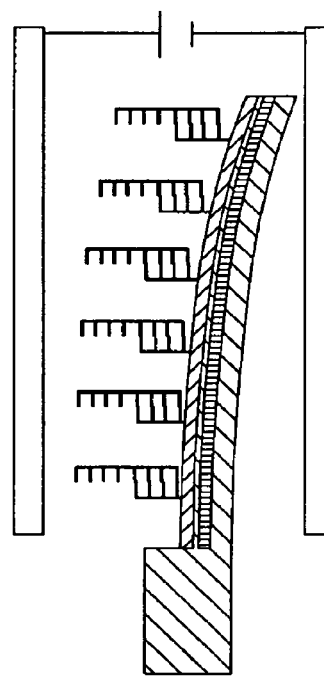
FIG. 1d is a schematic drawing of an electrically-induced deflective amplification transducer in optic fiber form after molecular detection.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The following is a listing of reference numerals used throughout the specification and the drawings:
- 110 bottom conductive surface
- 115 top conductive surface
- 120 bottom photoresist layer
- 125 top photoresist layer
- 130 fiber
- 140 laser beam
- 150 lens
- 160 detector The present invention is a nanomechanical sensor having electrically induced deflective amplification (E-IDEA) for the adaptive and reconfigurable detection of chemical and biological molecules using various transducers including optical fibers, microfabricated cantilevers, wave-guide and nanowires/nanotubes or using piezoelectric or piezoresistive methods, optical interfemetry or other methods that will be obvious to those skilled in the art.

The bending of the transducer changes the position of an emitted or reflected laser beam that is monitored by using a position sensitive photo-detector as shown in FIG. 1. One end of the transducer is modified with chemicals or bio-receptors and the emitted or reflected laser beam is directed on the position sensitive detector. An electric field potential is then setup by applying a voltage across the transducer, which induces the bending of transducer depending on the magnitude and polarity of surface charges. Upon interacting with gaseous molecules or biomolecules, the surface charge density changes, as a result the transducer deflects due to electrostatic interaction.

By monitoring the deflection magnitude, the amount of molecules bound to the transducer is determined in real-time and without any label. Based on this completely different bending mechanism, E-IDEA sensors have the same advantages as traditional cantilever sensors, yet, overcome the limitations of surface modification sensors and provide both adaptivity and reconfigurability for detection, recognition and system integration.

In addition, the transducer bending is actively controlled by external electric fields, and the surface molecules are removed when the magnitude of electrostatic attraction force acting on the molecules exceeds a threshold value, desorption free energy change. The electric field induced desorption reflects the nature of adsorbed molecules using a novel spectroscopic method named as electric field programmed desorption (EFPD). Compared to asymmetric structured transducers, E-IDEA transducers with symmetric shape (fiber and wire) operate at high temperature where the emitted laser is used for detection to completely eliminate the problem of laser beam misalignment in prior art cantilever sensors.

Figure 2:
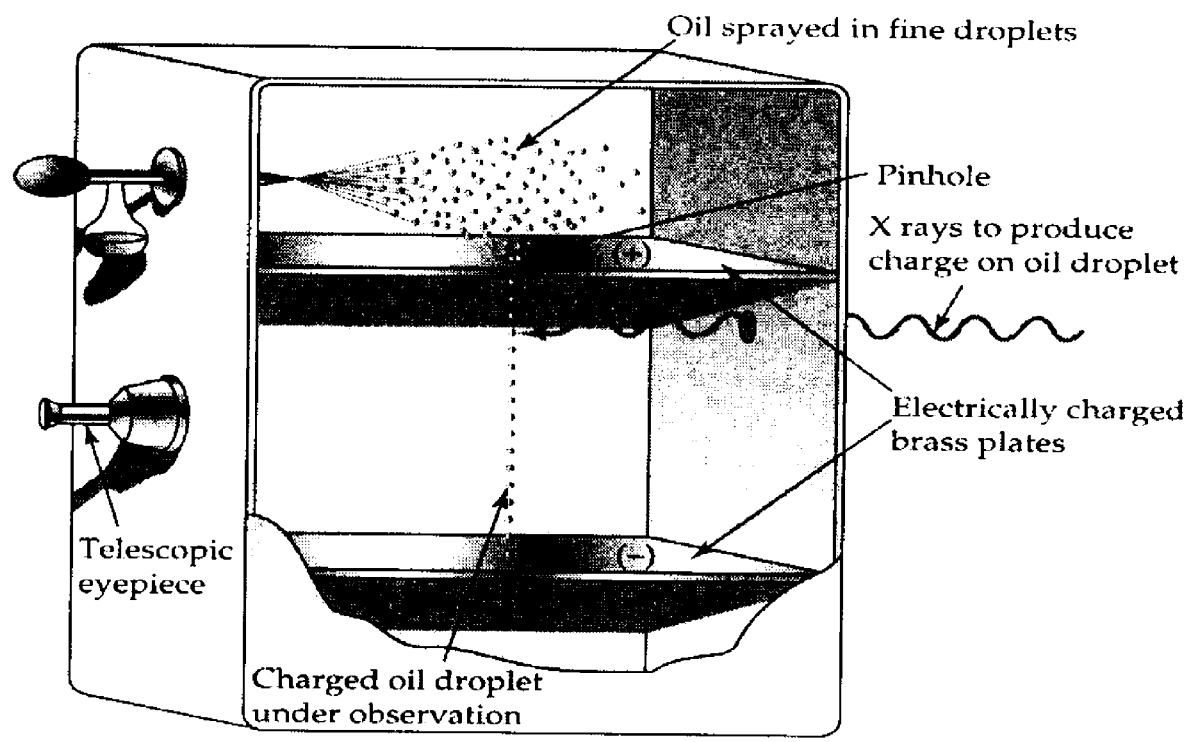
FIG. 2 shows a setup of Milikan's Prior Art oil droplet experiment.

Electrically-induced deflective amplification (E-IDEA) is based on the Coulomb's law of electrostatic interaction. A charged object between two electrodes with a potential difference moves in one direction depending on the polarity of the object. The electric field induced motions was explored in Faraday's demonstration of electrostatic repulsion between charged gold particles, in Millikan's oil droplet experiment to measure the unit charge of electron, and also in electrophoresis to separate biomolecules. Millikan demonstrated that the charged oil droplet has constant velocity when the gravity is equilibrated by electrostatic interaction as shown in FIG. 2.

There are many other examples of utilizing electric fields to control the motion of particles: for example, an ink-jet printer uses electric attraction to guide the motion of charged toner particles. However, implementing the fundamental effect as a novel-sensing concept into a functioning device that is capable of adaptive and reconfigurable detection and recognition is unexplored, even if electrostatic actuators have been used for many years to generate large motion and force. The effect of surface charge on the bending of E-IDEA transducers is calculated by using available electrophoretic data of 4.5 µm polystyrene microparticle. The electrophoretic force was measured using optical tweezers in an aqueous solution of sodium chloride, where an electric field of approximately $3.33 \times 10^3$ V/m generated a $2.5 \times 10^{-13}$ N electrostatic force as discussed by K.-I. Wada et al. in "Electric charge measurement on a single microparticle using thermodynamic analysis of electrostatic forces, Appl. Phys. Lett. (2002), 81, 1768.

Providing the same surface charge density and electric field as those on the polystyrene particle, the electrostatic force acting on the free end of a cantilever transducer approximately 200 µm long, 20 µm wide, and spring constant of 0.05 N/m in this example, bends the transducer for 2.8 nm, which is the typical bending generated in stress-based detection. From an engineering perspective, the bending of the transducer depends on the strength of electric field rather than the absolute voltage. By reducing the electrode gap to micrometer scale, the required voltage can be dramatically decreased. For instance, approximately 1.92 V DC across a 10 µm electrode gap generates $1.92 \times 10^5$ V/m electric field strength which is the typical value in Millikan's experiment. If the charge screening is at the similar level as that of approximately $3.33 \times 10^3$ V/m, the electric field of $1.92 \times 10^5$ V/m produces approximately 160 nm bending at the end of the transducer.

For a solid object in dry conditions, all surface charges are neutralized due to adsorption of charged ions or particles from air. The charge balance is broken by various means such as friction, heat treatment, light illumination, and chemical modification. Two common examples are rubbing a glass rod with silk which produces a positive charge, and rubbing a plastic rod with fur which produces a negative charge. In solution, simple electrolytes and polyelectrolytes (e.g., DNA, protein, and peptides) hydrolyze to form charged ions, which attract oppositely charged ions and form electric double layer.

An important concept of E-IDEA is electric field induced desorption. Absorbed molecules can be removed from the transducer by increasing the electric field strength over the threshold. An example of this process comes from the gel electrophoresis of long DNA molecules. Some DNA chains are trapped on gel fibers at low voltage, and they extend as the electric field increases. Eventually the DNA chain is broken and the segments are carried away by electrophoretic force.

For E-IDEA based detection and desorption in liquid, especially aqueous condition, the voltage is carefully controlled to avoid the electrolysis of water into hydrogen and oxygen. The minimum hydrolysis voltage of water is approximately 1.24 volts. According to standard theory, no reaction should take place at room temperature below this voltage. At the same time, the electrode gap can be reduced to provide sufficient electric field in order to remove the adsorbed molecules. To facilitate desorption of absorbed gas molecules in dry conditions, extremely high electric field strengths are required which is incompatible with portable devices. It is important to note the field evaporation/desorption of strongly bonded surface atoms has been performed at the strength of $5 \times 10^9$ V/m.

However, the gas sensing applications usually require moderate adsorption, which means an optimal operation range between approximately $5 \times 10^9$ V/m and $1.92 \times 10^5$ V/m is used to remove absorbed gas molecules. In addition, the electric desorption is assisted by other techniques such as laser or thermal heating to reduce the energy barrier of desorption. E-IDEA transducer of the present invention is based on a different mechanism from electrostatic force microscopy or redox-molecule modified cantilever sensors. In both cases a conductive cantilever is used, and the charge density on both electrodes is determined by the voltage applied on the electrodes.

Figure 3:
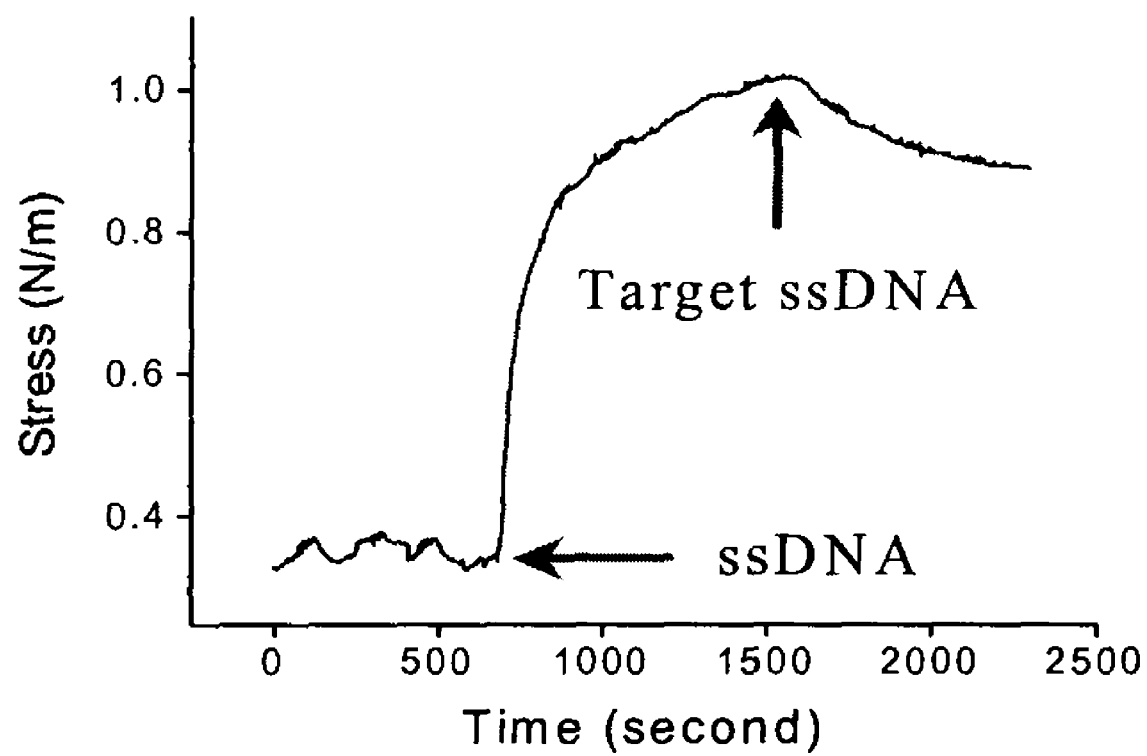
FIG. 3 is a graph of stress change in the immobilization of single stranded DNA and the hybridization of complementary sequence on cantilever.

Three experiments were used to test the novel sensing technique of the present invention. The first experiment involved immobilization and hybridization of DNA on the cantilever. The gold-thiol interaction was utilized to immobilize thiolated single stranded DNA (ssDNA) onto a thin gold film deposited on one side of a cantilever sensor. The surface stress change was used to confirm the immobilization of captured ssDNA and the hybridization of target ssDNA. Both the immobilization and the hybridization generate changes in surface stresses that are measured using real-time in solution. FIG. 3 shows a typical surface stress change induced by approximately 20 base pair ssDNA as a function of time. The immobilization leads to an increase in surface stress while the hybridization leads to a decrease in surface stress. This trend of stress change has been observed on different length of ssDNA (5, 10 and 20 base pair). It was not possible to measure cantilever bending in an electric field, and the experiments suggested the bending could occur only above threshold electric field strength that is not achievable in the current system because the electrode gap (greater than approximately 3 mm) is too large to produce sufficient electric field strength.

At the same time, when using a high DC voltage or even a pulsed voltage with a 20 V height and 10 ms width water electrolyses and bubbles form in aqueous solutions. Such problems are solved using low voltage less than approximately 1 V on a microfabricated electrode gap.

The second experiment involved electric attraction of charged microwires. In this example, short pieces of glass fibers with diameters from approximately 500 nm to approximately 200 µm were drawn using fiber drawing methods. The freshly drawn fibers stick strongly to a flat stainless steel plate. After staying in the ambient condition for few hours, the fibers can be removed from the plate easily. When an insulating collector is placed directly underneath the fiber outlet, the orientation of a fiber is determined by those already there, and the fibers are eventually distributed in a circular pattern in the round container.

The highly charged glass fibers repel each other and are attracted to an oppositely charged object because the high temperature (e.g., 850° C.) drawing process produces surface oxygen sites with unsaturated dangling bonds. When pulled through a rubber puller, the glass fibers are charged. The adsorption of charged or dipolar species from air neutralizes the negative charges on the fibers, making them less repelling to each other. Actually there are many daily examples of electrostatic interactions that are similar to this one. The challenge is to implement electrostatic interaction into a small device without using high voltage.

A third experiment involving localized reaction in high electric fields was performed using microfabricated electrode gaps with sizes ranging from approximately 5 μm to approximately 50 μm which is similar to the designed electrode gaps in E-IDEA sensors. The three-dimensional structure of electrodes produced a localized high electric field greater than approximately $10^5$ V/m at low voltage of approximately 10 V. When the silicon chip with electrodes was put into a chamber that was saturated with the vapor of organic molecules such as thiophene or pyrrole, a polymerization reaction occurred between the electrodes in the presence of water.

Figure 4B:
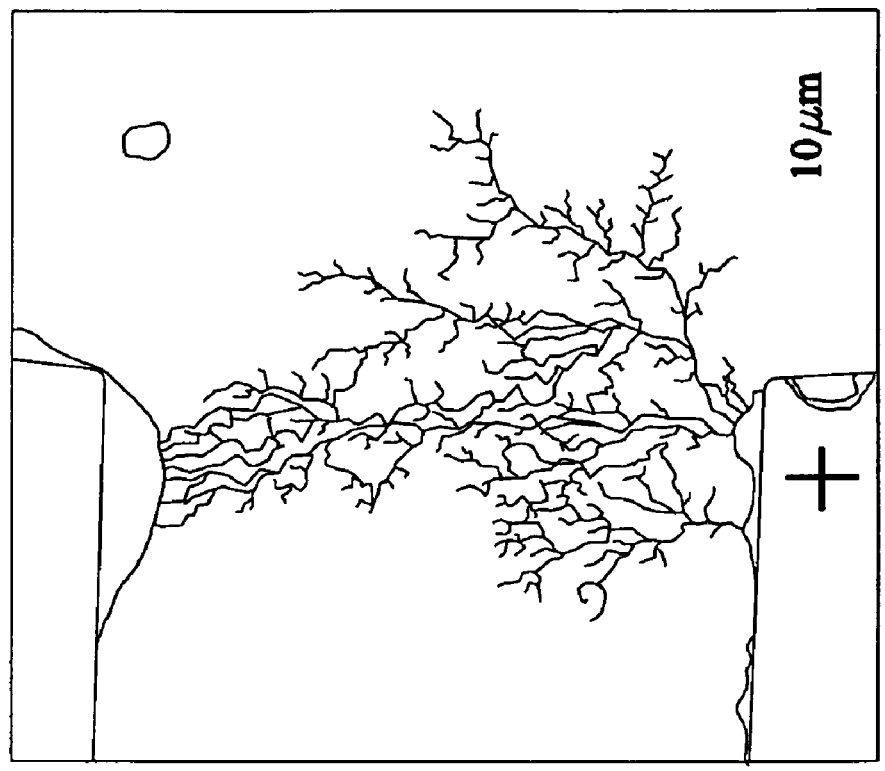
FIG. 4b is a photograph showing how a localized electric field breaks small organic molecules, and the fragment reacts with each other and forms condensed polymers of polypyrrole.
Figure 4A:
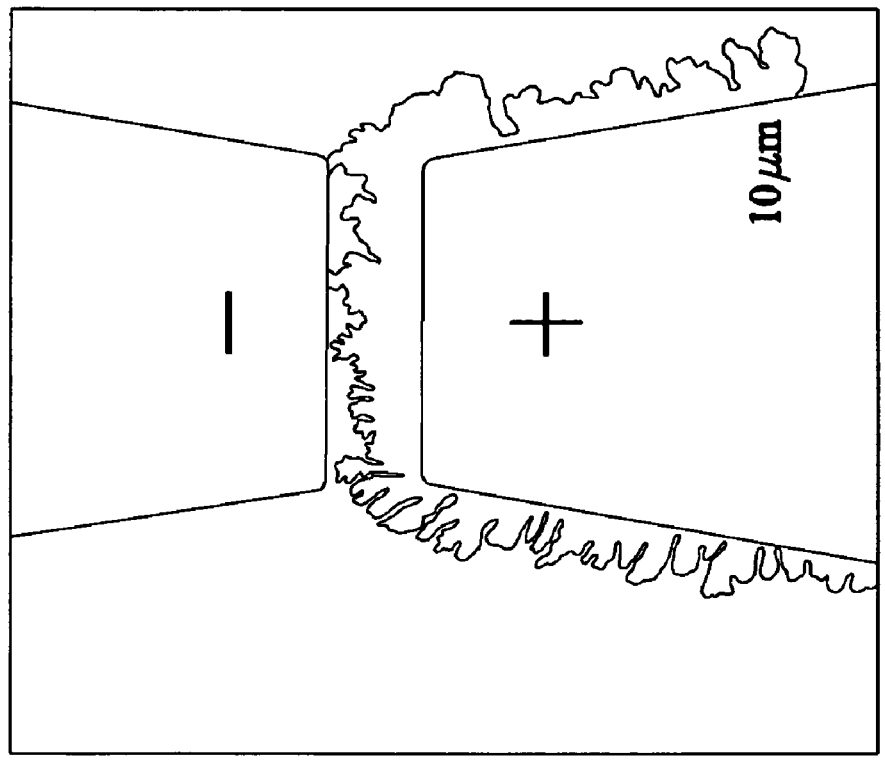
FIG. 4a is a photograph showing how a localized electric field breaks small organic molecules, and the fragment reacts with each other and forms condensed polymers of polythiophene.

FIG. 4 shows that a localized electric field breaks small organic molecules, and the fragments reacts with each other to form condensed polymers of polythiophene as shown FIG. 4a and polypyrrole as shown in the FIG. 4b. As shown in FIGS. 4a and 4b, scanning electron micrographs indicate dendrite structures that are stable in high voltage electron bombardment during imaging. These structures have been confirmed as according polymers. From polymerization point of view, the reaction does require the formation of reactive ions or intermediates. The high electric fields remove hydrogen atoms from monomers and generate intermediates that can be linked together to form long and stable polymer chains on the substrate. The formation of reactive intermediates confirms that the strong electric field alters the structure of molecules.

The experiments and analysis described above showed that the novel approach for adaptive and reconfigurable molecular sensing was viable. Two important questions were answered or confirmed. First, electrostatic interactions generate considerable force on micro- or nanoscale objects capable of changing their bending status and pathway. Second, localized electric fields break molecular bonds and create ionized species. Thus, E-IDEA provides a new technique for sensing using a small electrode gap with voltage drift control to produce a high strength electric field and avoid hydrolysis of water. The present invention significantly advances the fabrication of adaptive and reconfigurable sensors.

Fabrication of E-IDEA Fiber Transducer

Figure 5A:
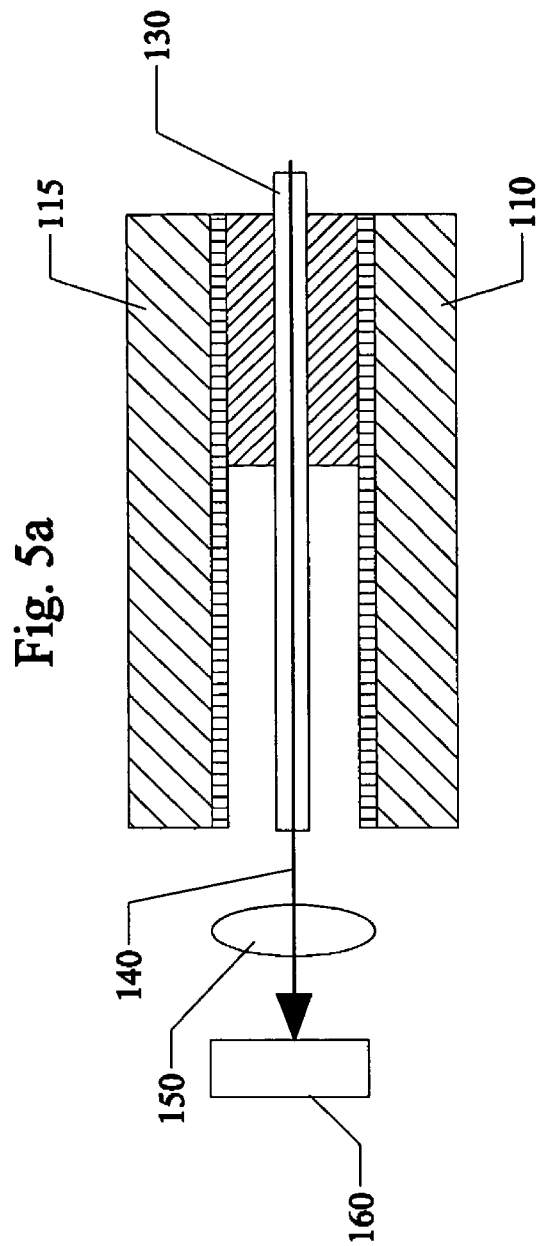
FIG. 5a is an illustration of how the bending of E-IDEA microfiber and nanowire transducers are measured.
Figure 5B:
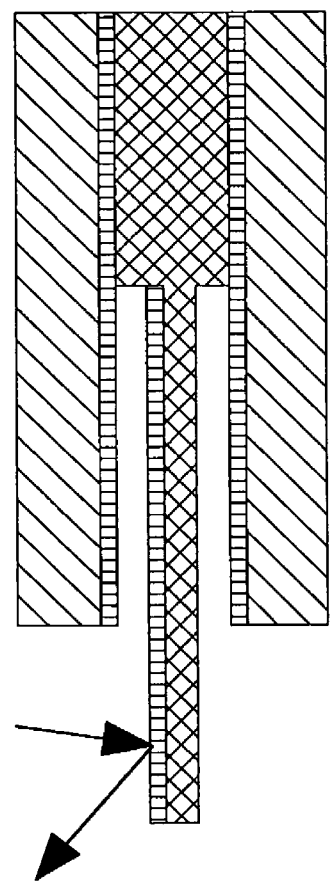
FIG. 5b is an illustration of how the bending of E-IDEA cantilever transducers are measured.

After deriving the relation between the surface charge and the length and diameter of cylinder shaped E-IDEA transducers, the focus is on the operating principle which is to balance the elastic energy cost with the electrostatic energy gain. Providing two parallel plates with separation d and electric potential difference V, the bending of the transducer is determined by equating the elastic force with the electrostatic force. In this process y(x) is the deflected distance of the transducer from equilibrium position at point x, where x is the distance along a relaxed transducer from the fixed end. The static equilibrium shape y(x) at voltage V is obtained by minimizing the free energy $$G_{total}(y) = -\frac{2\pi RVD}{d}\int_0^L y(x)dx + \frac{\pi E R^4}{4}\int_0^L \left(\frac{d^2 y}{dx^2}\right)^2 dx \quad (1)$$

where D is charge density on the transducer; E, L, and R are the Young's modulus, the length and the diameter of the transducer, respectively. From the equation, a long and narrow fiber bends more, providing other conditions are identical. The bending of the E-IDEA transducer is dependent on charge density, electric field strength, and the mechanical property of material. In order to have high electric field strength, the electrodes are placed as close as possible. An approximately 1 V DC voltage generates $10^5$ V/m field across a 10 μm gap. In this nanoscale exploratory research (NER), E-IDEA was proved and the first generation transducer was created with two electrodes 170 above and underneath an optical fiber 130 to detect the bending using a transmitted laser beam 140 as shown in FIG. 5a. FIG. 5b shows measuring the bending of cantilever formed on a silicone wafer due to reflection.

A fiber drawing tower was used, which makes micro- or nano-scale glass fibers by combining fiber drawing and selective chemical etching. In this method, the length, diameter and structure of the glass fiber is pre-designed to achieve desired mechanical and optical properties. Such fibers are incorporated in the fabrication of E-IDEA sensing devices using photolithography. The transducer can also be made using highly integrated photonics. Silicon waveguides are used to guide and confine light in micro or nanometer low-refractive-index materials. Two electrodes are fabricated across the suspended optical waveguide. The transducer bending is determined using a position sensitive detector. Alternately, either piezoelectric or piezoresistive approach can be substituted for the all-electronic detection of E-IDEA transducer bending.

Examples of Applications for E-IDEA

The sensitive and selective detection of charged ions in aqueous solution has significant implications for environmental protection, water treatment, national security, and health related issues. Current approaches depend mostly on electrochemical analysis, optical absorbance, and flame atomic absorption, which suffer from low sensitivity, bulky setup, and are inappropriate for on-site and real-time analysis. Micro- and nanodevices play an important role for such applications. However, most previous efforts were focused on the detection of certain molecules, media, metal ions, and chlorines, using established sensing platforms such as resistive/electric, optic and nanomechanical cantilever sensors. With the novel E-IDEA of the present invention, it is possible to build adaptive and reconfigurable sensing devices for the detection of charged non-biological species focusing on two common but important properties, pH value and chromium ion content. The purpose of the previous research is to establish the basic concept and methodology of E-IDEA sensing through a comparison with well-known detection systems.

In aqueous solution the electrolysis of water prevents the utilization of voltage high than approximately 1.24 V, otherwise the production of hydrogen and oxygen generates bubbles that disturb the bending status of the transducer. In order to have the same level of electric field as that in Millikan's experiment, the electrode gap is approximately 10 μm at voltage of approximately 1 V. Meanwhile the voltage drift in experiment is compensated relative to a reference electrode using a potentiostat. In this experiment self-assembled monolayers were used to modify the surfaces of E-IDEA transducers. To detect pH value, aminopropyltriethoxysilane that results in a surface terminating with —NH$_2$ and —SiOH groups was used. These functional groups have different dissociation constants; thus the sensor can detect both low pH and high pH.

At low pH, the —NH$_2$ group is protonated to form —NH$_3^+$. At high pH, —SiOH is deprotonated to —SiO$^-$, resulting a linear response in electric/resistive nanosensors. The bending direction and magnitude are dependent on polarity and electric field strength, and the bending is fully reversible when the solution changes between acidic and basic. In addition the effectiveness of E-IDEA transducers to detect chromium ions dissolved in water was studied. The transducer surface was modified with a self-assembled monolayer of L-cysteine that has high selectivity to chromium ions and the response of the E-IDEA transducer at different electric field strength was studied as a function chromium ion concentration.

Sensing of DNA Hybridization and Conformational Change

Another application for using the E-IDEA is sensing of DNA hybridization and conformational change. An important structural feature of DNA, as well as proteins and polypeptides, is that the molecule is highly charged under standard, physiological and pH conditions due to the existence of phosphate groups on backbone. A DNA chain has a net effective density of one fundamental negative charge each 0.17 nm of its length, which is approximately two times the charge density as a single stranded DNA (ssDNA) with the same length. The intrinsic charge difference is utilized to detect target DNA electronically or electrochemically. From another standpoint, both double and single stranded DNA move to the anode in solution, but with different attraction forces.

Figure 6:
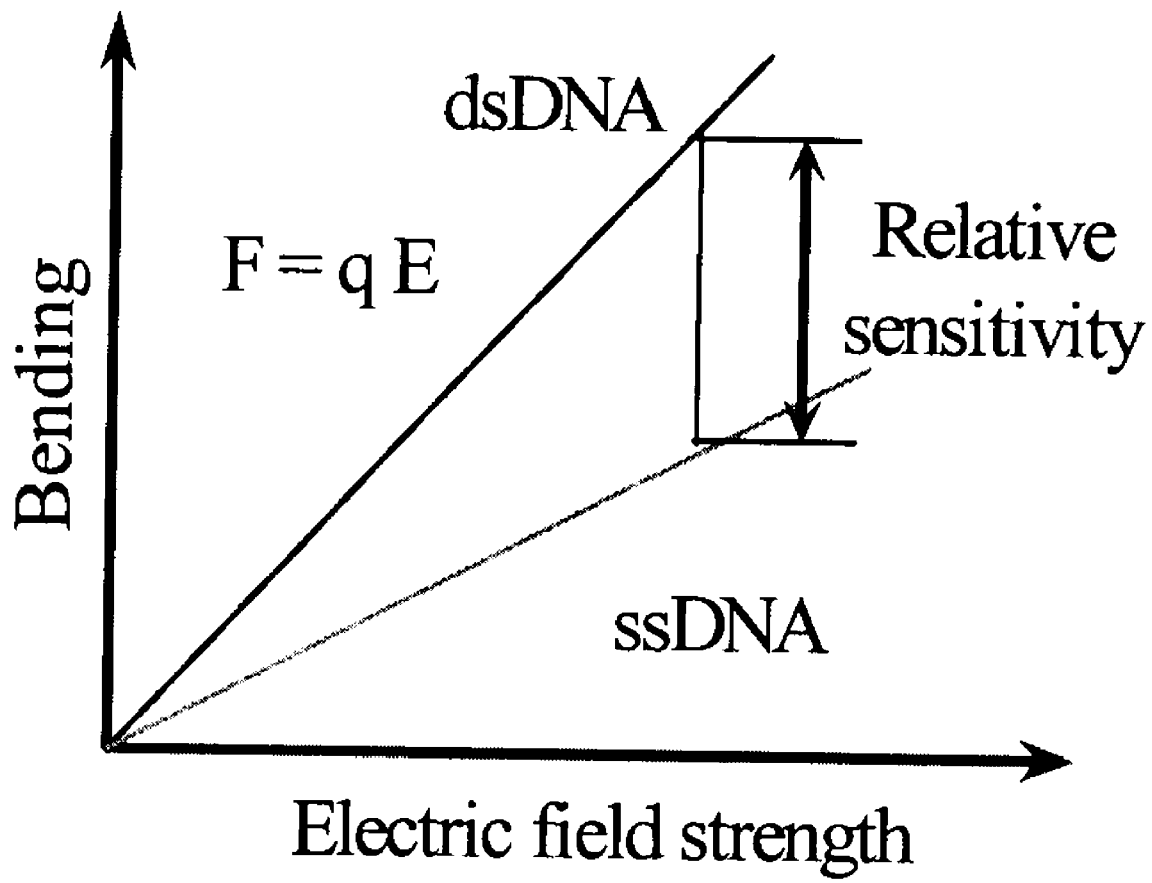
FIG. 6 is a graph of the bending of an E-IDEA sensor in the detection of DNA hybridization.

If ssDNA is first immobilized on an E-IDEA transducer, the hybridization to its complementary ssDNA increases the net negative charge. If the bending of the modified transducer is monitored in an electric field, the transducer bends more towards the anode due to the increased electrostatic attraction. In essence, a greater net negative charge and higher electric field strengths leads to a larger bending as shown in FIG. 6, and the detection sensitivity is adaptively changed by working at different electric field strength. A position sensitive detector picks up the signal associated with the bending and reflects the hybridization of target ssDNA. Principally, E-IDEA methods can be applied to detect protein concentration, study the interactions of antigen-antibody, DNA-protein, and polyelectrolytes, both peptide and lipid, measure the binding affinity of biological complexes and thermodynamic parameters related to the protein conformation changes.

The present invention focuses on the adaptive detection of target ssDNA, and the conformational change of DNA double helix using an E-IDEA transducer. Experiments have immobilized capture ssDNA on gold surface, hybridized to its complementary ssDNA, and studied the interaction of thus-formed double helix with intercalating drug (ethidium bromide) using cantilever sensors in stress-bending mode.

Other experiments have immobilized capture ssDNA on the glass fiber and detected the hybridization of target ssDNA using E-IDEA transducer at different field strength. Usually DNA double helix are treated as a semi-flexible rod with persistence length of approximately 50 nm under physiological conditions. Polycations neutralize the negative charges, and induce the condensation of DNA chains into compact globules, which are important for the delivery of gene drug and the packing of chromosomal DNA in cell nucleus.

Experimentally, an E-IDEA is used transducer to monitor the real-time change in the electrostatic property of DNA. In addition, E-IDEA sensor are used to measure the mechanical properties of DNA in an electric field. Through extended activities, the applications of E-IDEA sensors is extended to various fields, and establish E-IDEA as the basis for the next generation platform with adjustable sensitivity, real-time and label-free detection ability, and portability.

Electric Field Programmed Molecule Desorption

E-IDEA provides an opportunity to identify the nature of surface adsorbed molecules by monitoring the bending behaviors under electric fields with programmed strength changes. It is possible to break the double helix DNA formed by two ssDNA chains, and obtain energy barriers related to separate different numbers of base pairs. The purpose of this is to determine whether E-IDEA can be used to sequence target DNA with high or single base pair precision by controlling the electric field strength. Previous works indicated the mechanical unzipping of DNA double helix with rough resolution as a way of sequencing.

Figure 7:
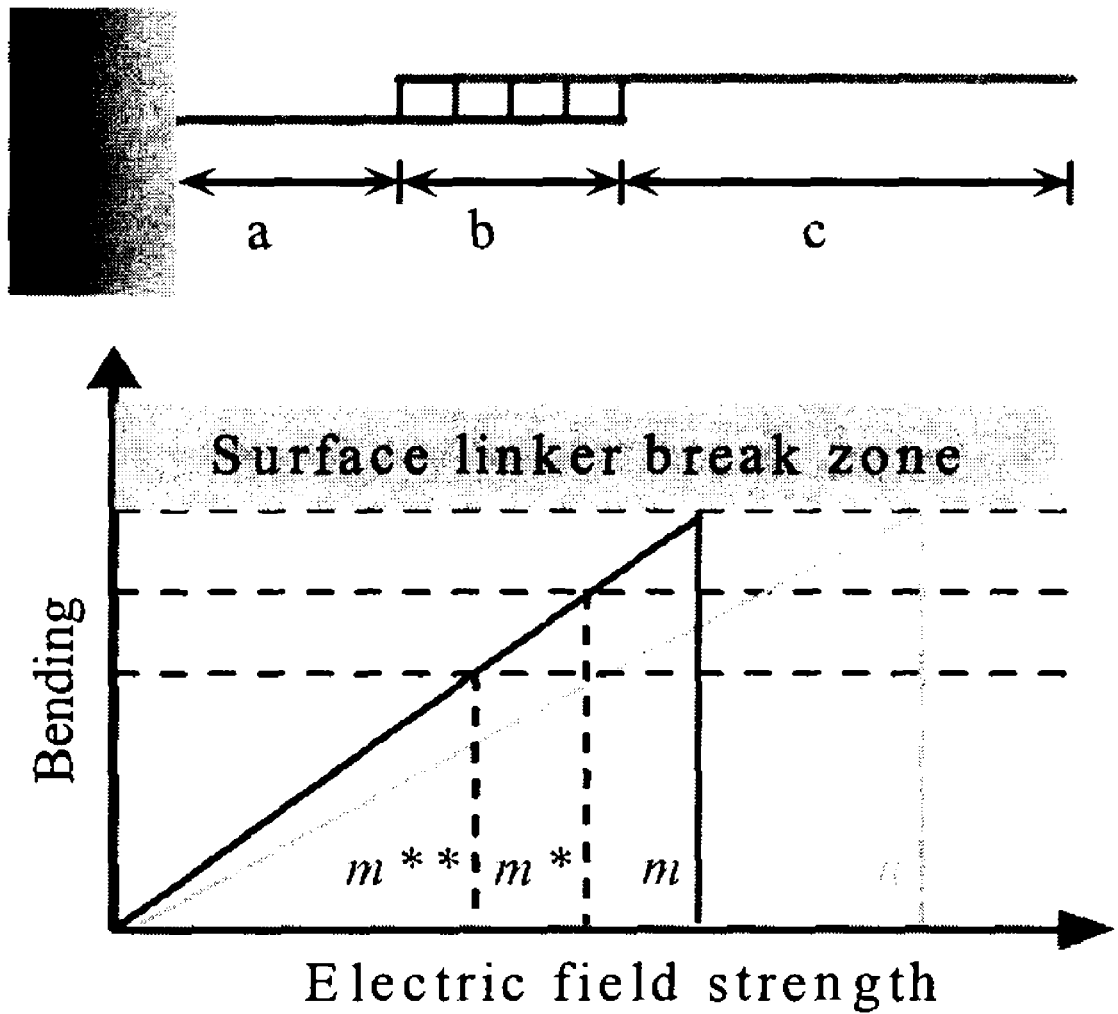
FIG. 7 is a graph showing the bending at various electric field strengths and the DNA desorption from E-IDEA transducer.

For solution based E-IDEA, whether the DNA chain is removed or unzipped is strongly is dependent on the relative strengths of surface linkage and complementary basepairs. The covalent bonds between surface-molecules are broken at approximately 1.4 nN (sulfur-gold) and 2 nN (silicon-carbon) as shown in direct force measurements. For a DNA chain immobilized on an E-IDEA transducer, the forces acting on the surface linker and the complementary base pairs are:

$$F_{linker} = \frac{(a + 2b + c)}{0.17} \cdot E_{eff} \text{ and } F_{basepair} = \frac{(2b + c)}{0.17} \cdot E_{eff} \quad (2)$$

where $E_{eff}$ depends on the voltage, electrode gap, and charge screening in solution, a, b and c are the physical lengths of DNA chains shown in FIG. 7. If $F_{linker} > F_{bond}$, the whole DNA desorbs. If $F_{linker} < F_{bond}$, the unzipping of DNA double helix occurs. The slopes in bending vs. electric field strength curves depend on the length (a+2b+c): longer chains have large slopes; for DNA chains with the same length (m, m*, and m**), the turning point in the bending curve shows the number of base pairs in the b zone. The sequence m has more complementary base pairs than the sequence m*.

By linearly increasing the electric potential with high resolution (mV) and stability using a potentiostat, the single base pair mismatch is distinguished using E-IDEA detected desorption. Not limited to DNA, the electric field induced desorption of adsorbed molecules in general determines how strong they are adsorbed, and identify their natures using characteristic desorption electric field strengths. This spectroscopy is called as electric field programmed desorption (EFPD) that is analogous to temperature programmed desorption (TPD). The temperature programmed desorption studies of adsorbed organic acids from several zeolites confirm that programmed desorption is an effective way to identify molecules. If the desorption strengths of the electric field in EFPD are too high for portable devices, other methods with constant energy inputs such as laser, UV, or heat to reduce the energy barrier are used.

In another experiment, it was shown that UV radiation removes organic species from a silicon nitride and titanium oxide cantilever operated in stress mode. In EFPD, the adsorbed species (e.g., gaseous molecules, biomolecules, or dissolved ions) are removed from the transducer surface evenly and the transducer bending is proportional to the number of the surface adsorbed molecules. The desorption rate of the surface species is then:

$$R_{des} = -\frac{dN}{dt} = vN^x \cdot \exp\left[\frac{-(E_a^{des} - E)}{RT}\right] \quad (3)$$

where $R_{des}$ is the desorption rate, x is the kinetic order of desorption, and $E_a$ is the desorption activation energy. E is the external electric field strength and increased linearly with time from initial $E_0$ $$E = E_0 + \beta t \text{ and } dE = \beta \cdot dt \quad (4)$$

The bending of the transducer in terms of detector signal is proportional to desorbed molecule number, and the rate at which the surface concentration of adsorbed species is decreasing:

$$V(E) \propto -\frac{dN}{dE} = \frac{v \cdot N^x}{\beta} \cdot \exp\left[\frac{-(E_a^{des} - E)}{RT}\right] \quad (5)$$

Electrophoresis Used I-IDEA Sensors

Gel electrophoresis identifies and separate DNA and protein, studies the interactions of biomolecules, and is critically important to genomics and proteomics. The separation depends on the charge and mass. The electric attraction drives the motion of molecule and the frictional force with the gel matrix separates the molecules by size or conformation. The gel is a cross-linked polymer matrix that is immersed in the buffer. Ions in the buffer carry the current and keep the pH at constant value. In capillary electrophoresis, friction arises from the interaction with the inner wall of the capillary tube. There are some limitations of current electrophoresis: (1) it takes large amounts of sample that may be difficult to prepare; (2) the sensitivity and resolution of the detection is low; (3) the analysis takes tens of hours to complete; (4) the microstructure of gel varies from sample to sample, making structure-performance correlation and cross-comparison difficult; (5) the trapping of long DNA molecules in the media will lead to band smearing and is one major challenge faced by the traditional gel electrophoresis; and (6) the high voltage used in capillary electrophoresis leads to sample heating and the possible denaturation of biomolecules.

Rather than pulling DNA off the transducer and doing traditional electrophoretic analysis, E-IDEA identifies the length of DNA in a mixture using a transducer with a porous structure as shown in FIG. 8a. The surface of the transducer is first modified with a positively charge monolayer. Then DNA segments with different length are loaded on the transducer as shown in FIG. 8a. Depending on the balance between the entropy loss of DNA localization and the energetic gain from adsorption, either loop that extends to the solution or trains that adsorbed on the surface forms. For a specific DNA-surface attraction, shorter chains maximize their entropy by having more loops, and longer chains exploit the energetic gains from adsorption by having more trains.

As a result, if an electric field is applied, the chains with different length experience different attraction per unit length, showing length-dependent mobility as shown in the graphs in FIG. 8b which show the bending at different electric field strengths. By sweeping the electric field from low to high, DNA chains with different length are removed at different voltage as shown in FIG. 8b. The bending of E-IDEA sensor at incrementally increasing electric field strength was monitored using the standard X-DNA ladder as sample. The obtained bending versus voltage curve is converted to DNA amount versus length curve, which is then compared with gel electrophoresis results, both shown graphically in FIG. 8b.

Integrated Nano-waveguide for E-IDEA Sensors

One-dimensional nanomaterials, such as, nanotubes, nanowires, and nanobelts, are highly promising sensing elements due to their small mass and large surface areas. Semiconductor nanowires have been used to make electric/resistive sensors or sensor arrays. However these sensors do not have good adaptability, reconfigurability, and molecular recognition ability. There are some technical challenges related to the fabrication as well. The first one is to manipulate the nanowire and control its position and orientation in a final device. The second is to address the response of each sensing element in an array. Alternative microfabrication can create integrated structure units that can be treated as nanomaterials with spatially defined locations and orientations.

Meanwhile, the effort to incorporate one-dimensional nanomaterials into nanomechanical devices is restricted by the lack of an integrated method to modify nanowires asymmetrically, and induce and monitor the bending of nanowires in real-time. Some semiconductor nanowire/belts are used as nano-waveguides that are capable of conducting light. Experiments were conducted to study the bending of nanowire/belt or glass waveguides in an electric field with an optical microscope or a position sensitive detector. Using E-IDEA according to the present invention, an asymmetric surface modification is not required and the bending magnitude is actively controlled by an electric field. Previously the bending and vibrating of individual carbon nanotubes have been observed using electron microscope, but not in a sensor format. Electrochemical processes can also induce the motion of carbon nanotube bundles in an aqueous solution. It is expected that the integrated E-IDEA nano-sensors would be able to detect antibodies or DNA at extremely low concentration or at the single molecule level.

Nanomechanical transducers work in a dynamic mode, where the resonant frequency is related to the effective mass of the transducer. One advantage of working in a dynamic mode is that it can detect small mass changes: single bacterial cells can be detected without damage. If the transducer surface is modified by some molecule or receptor, the change in concentration of target molecules is determined from the change in resonant frequency. By working in this mode, four response parameters, frequency, phase, amplitude, and Q-factor, are measured simultaneously to offer complementary information. As transducer sizes decrease to nanoscale or quantum scale, such devices approach gigahertz frequency, the sensitivity is higher, and many new phenomena may be discovered.

E-IDEA sensors work in dynamic mode by applying a time-dependent voltage to generate a time-dependent deflection. No piezoelectric crystal is required, which can be beneficial since the fabrication of piezoelectric crystals with high frequency and small size is difficult. E-IDEA in dynamic mode is tested using nanowires, or glass nanofibers, which are principally good sensing elements due to small size, large surface area, or superior mechanical properties.

Figure 9:
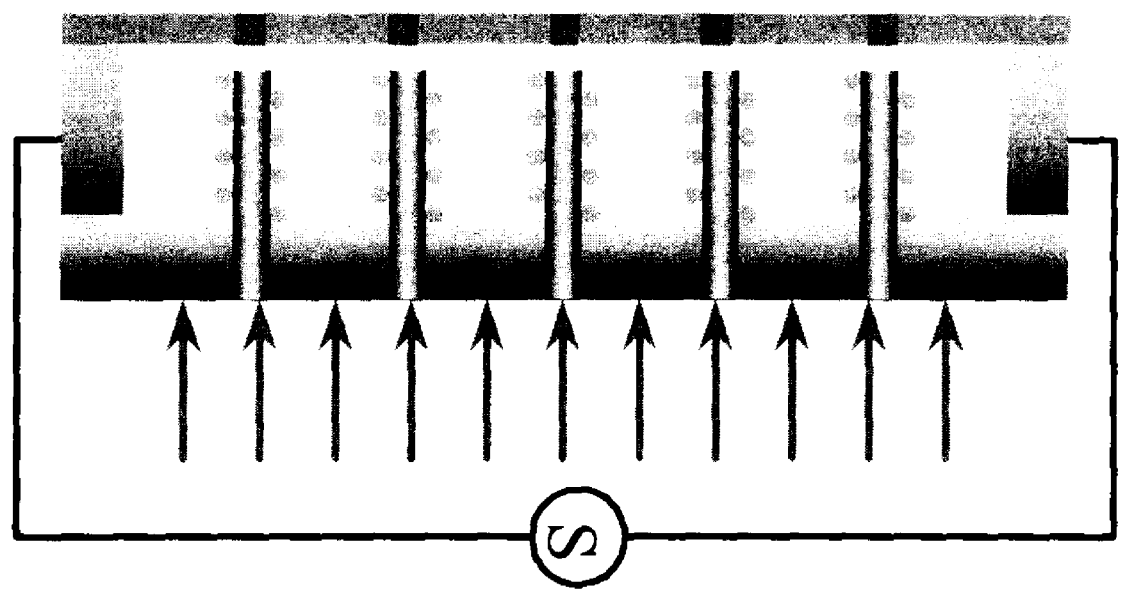
FIG. 9 shows E-IDEA of nanowire or nanofiber sensor array detected using fluorescence microscope or charge coupled device camera.

During the duration of this experiment, the detection of mercury vapor was explored. First a thin layer of gold is deposited on the surface of a fiber or nanowire. An electric field is applied across the transducer to generate vibration. The transducer is then exposed to mercury vapor, the changes in response parameters before and after exposure are recorded. Mercury atoms form amalgam with gold film, increase the effective mass and shift the resonant frequency of the transducer. In the second experiment, aligned nanowire or glass nanofiber arrays were used as waveguide transducers. The bending of transducers in electric field was monitored using a fluorescence microscope or charge coupled device (CCD) camera as shown in FIG. 9. A similar design was used to measure the resonant frequency of a carbon nanotube in an ensemble by observing the random motion of its field emission patterns.

Detection of Gaseous Molecules at Elevated Temperatures

The adsorption or reaction of gaseous molecules on solid surfaces change the electronic state or the charge density of the surface. This is the basis of electric/resistive sensors for the detection of gaseous molecules at high temperature. Similar changes in surface charges are used for detection using E-IDEA transducer. By using an axially symmetric transducer, such as fiber, waveguide, and nanowire, the thermally induced bimorph bending of the traditional cantilever is eliminated. Thus E-IDEA transducers detect gaseous molecule between 200 and 700° C., below the softening temperature of the transducer material.

One advantage of using an E-IDEA high temperature sensor is that the sensitivity is increased at high electric field. As a preliminary confirmation of this application, the bending of a thin film modified E-IDEA transducer at different temperatures and different electric field strengths was measured. The titanium oxide thin film prepared by sol-gel method is reactive at high temperature. Either heat treatment or gas adsorption changes the surface charge density, resulting in the bending of E-IDEA transducer in electric field. Compared to non-catalytic surfaces, the reaction of titanium oxide is faster and generates more surface charges. Thus, even if symmetric E-IDEA sensors are immune to fluctuations of room temperature, they can still be used as high temperature sensors provided other factors, such as, heating, adsorption, reaction, and desorption, can change the surface charge density.

According to experimental results, the E-IDEA transducer is a novel high temperature sensor for the adaptive and reconfigurable detection of gaseous molecules including hydrogen, carbon monoxide and explosive vapors.

Fabrication of Fiber Waveguide Transducer

Although fabricating a cantilever shaped transducer is a routine task for microfabrication, putting two parallel electrodes with 10 μm separation across a cantilever is technically difficult and expensive, concerning the current aspect ratio in deep reactive ion etching (20:1). The present invention discloses a method to place optical micro-fiber or nano-fibers into E-IDEA based detection systems. The special fibers are made by scalable fiber drawing technique combined with the state-of-the-art selective etching. The fibers are cut into desired length ranging from millimeter to tens centimeter.

Figure 10:
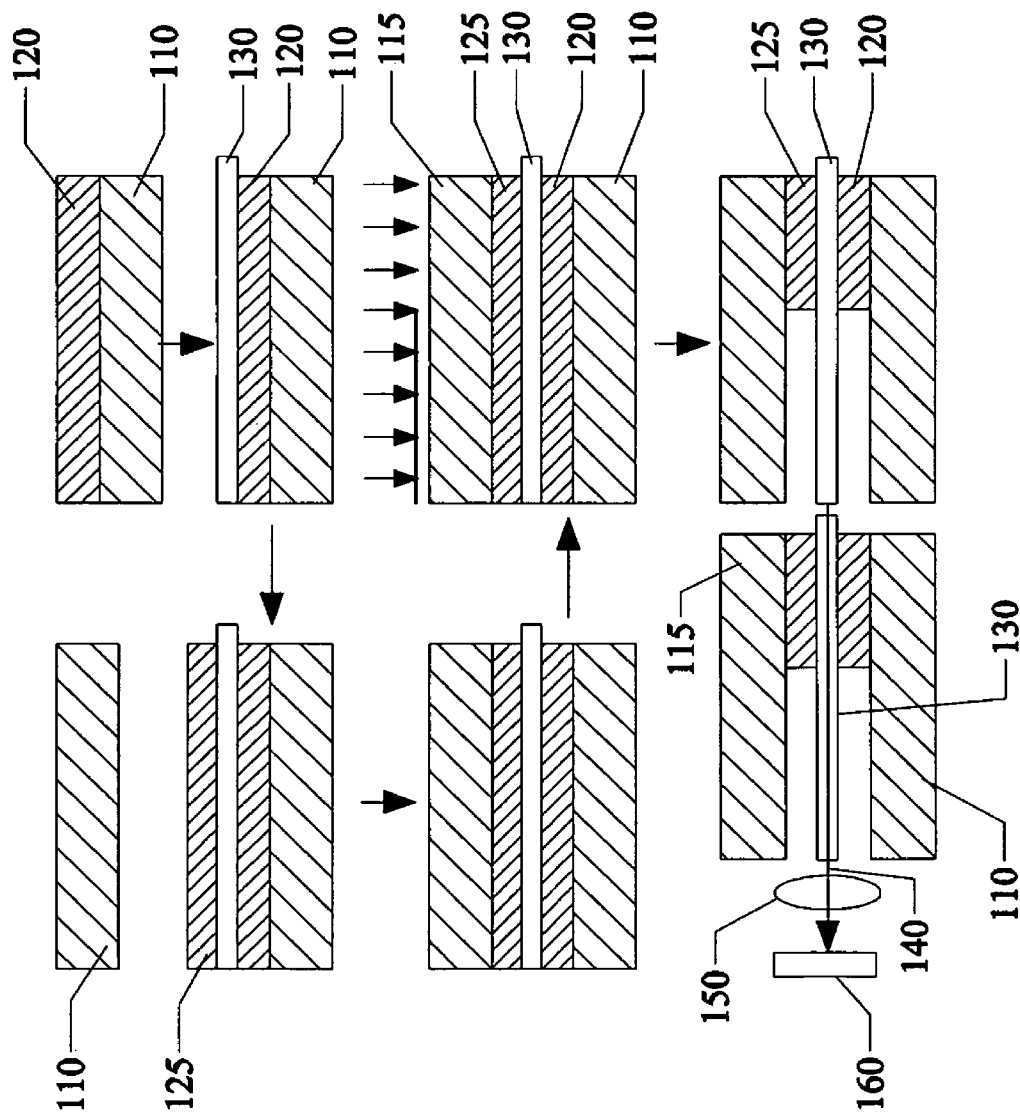
FIG. 10 is a flow diagram of the procedure for fabricating an optical nano-fiber based transducer.

FIG. 10 is a flow diagram of procedures to place a microfiber between two transparent conductive plates of the preferred embodiment. First, a 5 μm thick photoresist layer 120 is deposited onto a transparent conductive oxide surface 110 and soft baked. After putting a short piece of fiber 130 on the photoresist, another layer of photoresist 125, approximately 5 μm is deposited and cured. Subsequently another transparent conductive oxide 115 is layered on top of the second photoresist 125. After UV exposure for a period of time, the exposed photoresist is removed, leaving a partially suspended fiber 130 between two electrodes 120 and 125. A laser beam 140 transmitted through the fiber 130 is expanded and by a lens 150 directed onto a positive sensitive detector 160 or an objective of microscope. In this experiment, SU-8 is used as the photoresist due to its good mechanical and solution compatible properties.

Surface Charge Density Change of Functional Monolayer in Solution

Figure 11:
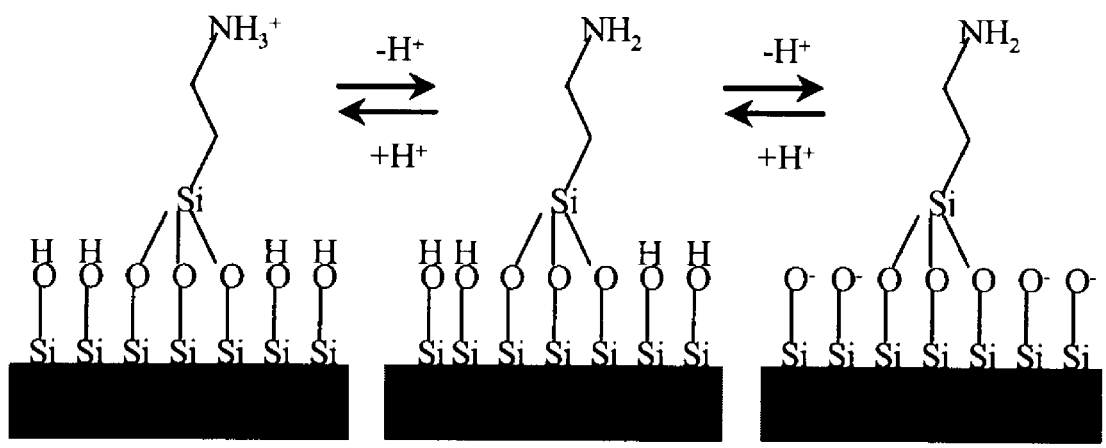
FIG. 11 illustrates the hydrolysis of amine modified silicon dioxide surface at different pH levels.

The self-assembled monolayer terminated with amine group hydrolyzde in an aqueous solution. On such surface, un-reacted surface hydroxyl groups coexist with amine groups. The two groups hydrolyze at different pH value: $NH_2$ hydrolyzes to $NH_3^+$ at low pH, and OH hydrolyzes to $O^-$ at high pH. The combination of $NH_2$ groups and OH groups extend the response to a wide range of pH as shown in FIG. 11. Thus the modified surface has different charge density at different solution condition, and thus can be used to study the E-IDEA of the transducer.

Temperature Programmed Desorption to Identify Organic Acids

Figure 12:
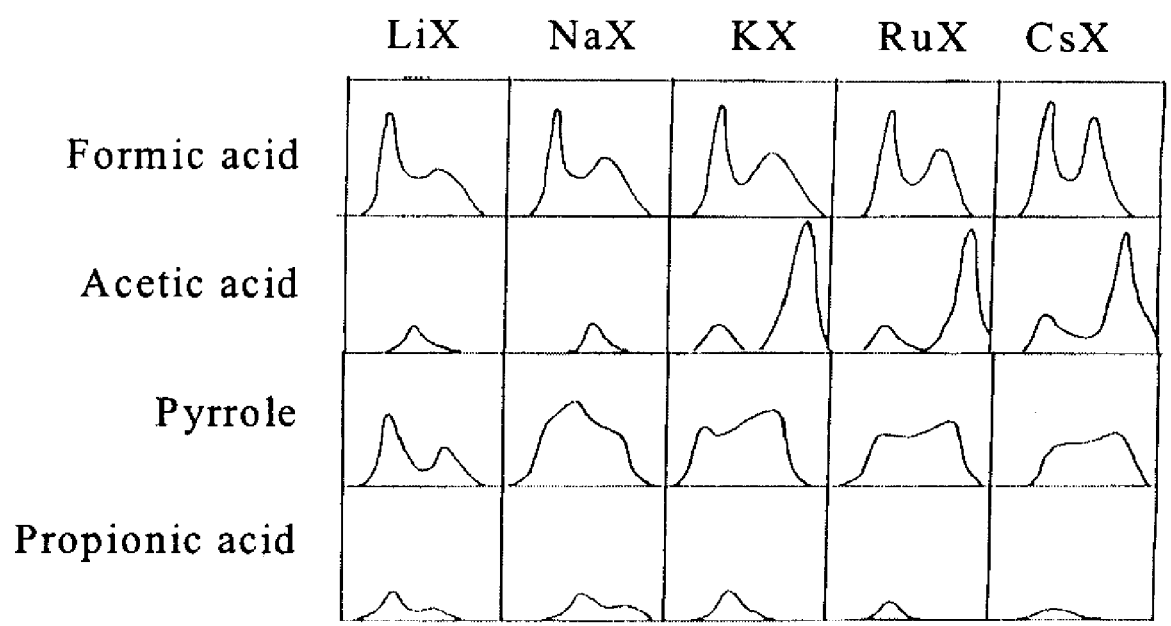
FIG. 12 shows temperature programmed desorption curves of different organic acids and pyrrole.

In the study of basicity on zeolite catalysts, a preferred method to study the adsorption of different organic acids on the surface of zeolites is using temperature programmed desorption (TPD). The shape of TPD curves strongly depend on the molecules and the zeolites. For example, FIG. 12 shows the TPD curves of different organic acid and pyrrole collected from different basic zeolites. As shown, formic acid and acetic acid have very different desorption behaviors on all the catalysts (LiX, NaX, KX, RuX, and CsX), even if the only difference is that acetic acid has one carbon and three hydrogen atoms more than formic acid, suggesting that the programmed desorption method is sensitive to the molecular structures. In addition, both the adsorption strength and the active site number can be determined from temperature programmed desorption curves: the strength of adsorption can be derived from the peak temperature and the amount of active adsorption sites can be calculated from the surface area under each peak.

UV Induced Desorption of Molecules from Surface

Figure 13:
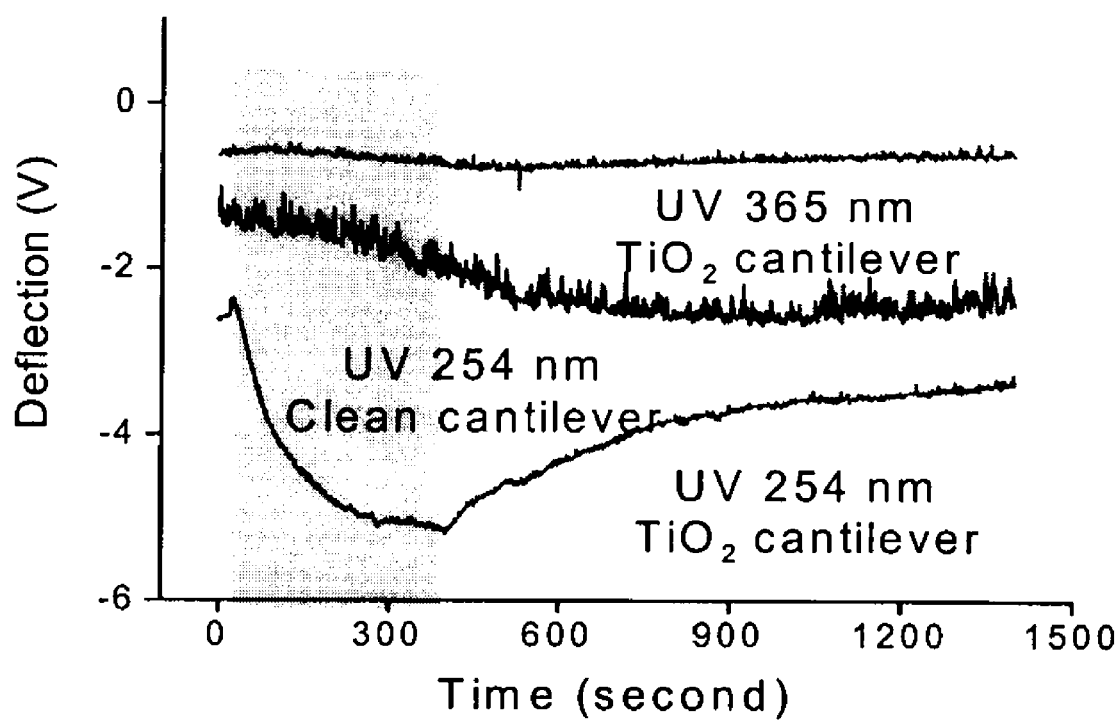
FIG. 13 is a graph of ultraviolet light induced bending of cantilevers.

The exposure of a $TiO_2$ coated cantilever to UV at a wavelength of approximately 365 nm bends the cantilever slightly. The exposure to UV at 254 nm radiation (5.1 eV) bends the cantilever significantly toward the light source, as shown in FIG. 13. The bending reaches saturation in approximately 400 seconds and partially recovers when the UV light is turned off. The exposure of a $Si_3N_4$ cantilever to UV at approximately 254 nm produces a monotonic and slow bending, and the magnitude is smaller than that of the $TiO_2$ coated one at the same conditions.

When UV light at approximately 254 nm is periodically turned on and off, the cantilever shows bending corresponding to the on and off, and the magnitude is proportional to the length of the radiation time. The photo-induced bending is explained as the removal of surface adsorbed species (oxygen) and the generation of active surface sites with unsaturated coordination. The cantilever then experiences a compressive surface stress on the UV-exposed side and a tensile stress on the other side, and thus bends toward the radiation source as the result of the stress imbalance. When the UV light is turned off, the readsorption of atmospheric $O_2$ which is usually faster than other adsorbates in ambient condition due to the high concentration, on active sites increases surface stress on the UV-exposed side and leads to a backward bending.

The partial recovery of bending confirms the effect of other adsorbates. The photodesorption follows the first-order kinetics: $dn/dt=-\sigma Fn$ where n is the number of adsorbed $O_2$, σ is the cross section of photodesorption, F is the photon flux, and t is radiation time. The bending of the $TiO_2$ coated cantilever with UV light in FIG. 13 is fitted to $V \sim \exp(-\sigma Ft)$, which gives a photodesorption cross section a of $2.4 \times 10^{-17}$ $cm^2/s$. This value is close to the value of the molecular oxygen species adsorbed on the defective $TiO_2$ (100) surface ($4.3 \times 10^{-17}$ $cm^2/$ s). Thermal effects of UV radiation are ruled out due to the low light intensity and continuous UV radiation. The surface coating on the cantilever has been confirmed using secondary ion mass spectrometer, where the elemental image shows the uniform distribution of Ti on cantilever, and the signal from Si can be hardly observed.

Glass Micro- and Nano-Fibers Made from Fiber Drawing Method

Figure 14:
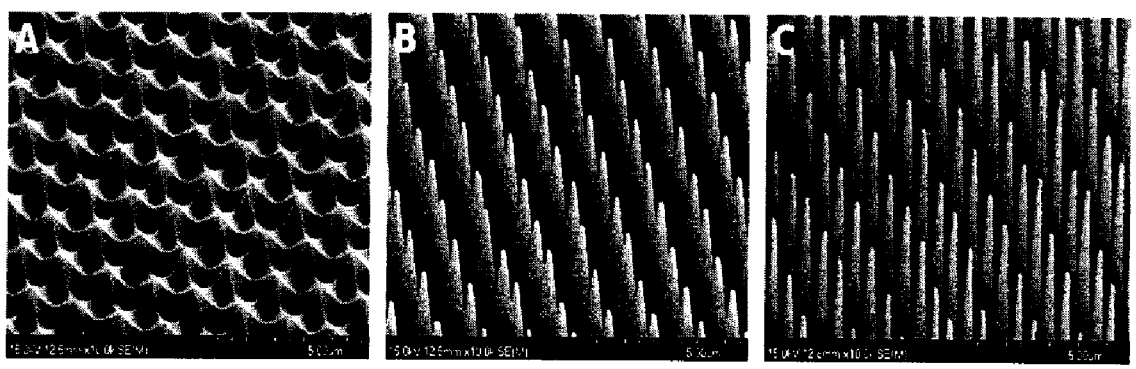
FIG. 14 shows scanning electron microscopy images of three nanostructured glass arrays.

Using a fiber drawing tower, it is possible to make special nanostructured glass with various diameter ranging from hundreds of nanometer to hundreds of micrometers. These fibers have different geometry and structures to allow defined researches. For example, FIG. 14 contains three scanning electron microscopy images of nanostructured glass samples that have ordered arrangements over several square centimeters. The versatile fiber drawing method and the selective chemical etching offers desired microfibers or nanofibers of glass, or embedded glass fibers suitable as optical waveguides for E-IDEA transducers.

Magnetic Force Induced Bending of Cantilever

Figure 15:
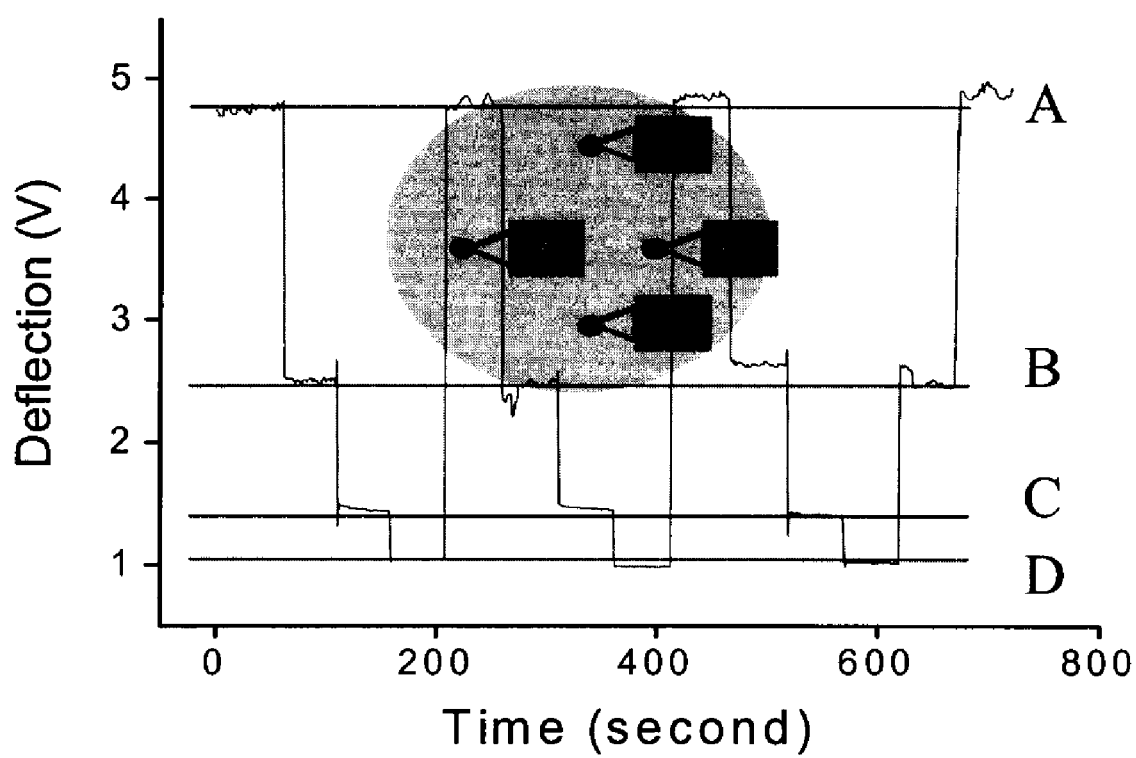
FIG. 15 is a graph of magnetic force induced bending of cantilever inducer.

The bending of nanomechanical transducers is a general phenomenon. Experiments on magnetic force induced bending of traditional cantilever sensor for the detection biomolecules using magnetic particle probes have been performed. In Sandwich immunoassay biotin modified cantilever and biotin labeled magnetic particles were used to detect antibodies in solution. The reaction between the biotin and streptavidin immobilizes the magnetic particles on the cantilever, which bends in the magnetic field of neodymium magnet. Other experiments were performed using 16-mercaptohexadecanoic acid to capture iron oxide nanoparticles on the cantilever. Results showed that the magnitude of cantilever bending is not the same at different position over the magnet, indicating the effect of magnetic field strength on cantilever bending as shown in the graph of FIG. 15 which shows the magnetic force induced bending of the cantilever transducer over time.

The methods for fabricating optical fiber or waveguide nanomechanical sensors can be used to fabricate sensors commercially available for many diversified applications including national security, public health, and scientific and technological development. Applications for the E-IDEA sensor of the present invention includes, but are not limited to, detection of gaseous, chemical and biological species, molecular recognition, spectroscopy, electrophoretic analysis and sensing at high temperatures.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A mechanical sensor having electrically induced deflective amplification for adaptive sensing of a physical property of a material comprising: a first and a second parallel electrode plates separated by a gap for applying a voltage difference to the first and second parallel electrode plates to generate an electrostatic field between the first and second parallel electrode plates; a non-magnetic and non-conductive reconfigurable transducer positioned within the gap between the first and second parallel electrode plates, the reconfigurable transducer bending in direct response to a change in the strength of the electrostatic field caused by a physical property of a material within range of the reconfigurable transducer which changes a position of an emitted or reflected light beam, the reconfigurable transducer comprising: one single micro- or nano-scale optical device; and a coupling device for guiding and confining a light beam for transmitting through the optical device, the position of the optical output changing due to the bending of the reconfigurable transducer in response to the detected material; and a detecting device to monitor the transmitted beam for detecting a position of the output of the reconfigurable transducer, the detected material identified by a change in position of the reconfigurable transducer.

2. The mechanical sensor of claim 1, wherein the reconfigurable transducer comprises:
one of a micro- or nano-scale optical fiber.

3. The mechanical sensor of claim 2, wherein the detecting device comprises:
a position sensitive detector for detecting a position of the transmitted light for determining the bending of the optical fiber.

4. The mechanical sensor of claim 2, wherein the detecting device comprises:
one of a piezoelectric or piezosensitive device for detecting a position of the transmitted light beam for determining the bending of the optical fiber.

5. The mechanical sensor of claim 1, wherein the first and second parallel electrode plates are separated by a distance of an approximately 10 μm gap and the electric potential difference between the first and second parallel electrode plates is approximately 1 volt DC to generate an approximately $10^5$ V/m electric field across the gap.

6. The mechanical sensor of claim 1, wherein the optical device comprises:
at least one of an optical fiber, a waveguide, a microfabricated cantilever, a nanowire, a nanotube, or a glass nanofiber.

7. The mechanical sensor of claim 1, wherein the mechanical sensor is used to detect at least one of a gaseous molecule, a chemical molecule or a biological molecule.

8. The mechanical sensor of claim 7, wherein the gaseous molecule is at least one of hydrogen or plastic explosives.

9. The mechanical sensor of claim 7, wherein the chemical molecule is at least one of ricin, heavy metal ions, or nitrogen compounds.

10. The mechanical sensor of claim 7, wherein the biological molecule is at least one of DNA or protein.

11. The mechanical sensor of claim 1, wherein the sensor operates in a temperature range from approximately 20° C. to approximately 700° C.

12. A system for detecting a physical property of a material consisting essentially of: a first and a second parallel electrode plate separated by a gap; a power source connected between the first and second parallel electrode plates for generating an electric potential difference in the gap between the first and second parallel electrode plates; a non-magnetic and non-conductive reconfigurable transducer that transmits a light beam positioned within the gap between the first and second parallel electrode plates, the reconfigurable transducer bending in direct response to detection of the physical property of a material within range; and a detection device to monitor the transmitted light beam from the reconfigurable transducer for detecting a bending of reconfigurable transducer in direct response to the detection of a physical property of a material within range of the sensor.

13. The system of claim 12, wherein the reconfigurable transducer comprises:
one of a micro- or nano-scale optical fiber;
a laser source for providing a laser beam;

a waveguide coupled with the optical fiber for guiding and confining the laser beam for transmitting through the optical fiber; and an amplifier for amplifying the transmitted fiber beam, the detection device detecting a position of the amplified laser beam for determining a physical characteristic of the material.

14. The system of claim 12, wherein the power source comprises:

a variable voltage source for generating a variable voltage for applying to the first and a second parallel electrode.

* * * * *